United States Patent [19]

Workens

[11] 4,255,214
[45] Mar. 10, 1981

[54] METHODS OF MANUFACTURING AND PROTECTING MIRRORS

[75] Inventor: Frank M. Workens, Jamestown, N.Y.

[73] Assignee: Falconer Plate Glass Corporation, Falconer, N.Y.

[21] Appl. No.: 853,409

[22] Filed: Nov. 21, 1977

[51] Int. Cl.$^3$ .............................................. C23F 9/00
[52] U.S. Cl. ............................. 148/6.14 R; 106/14.37; 106/14.42; 252/390
[58] Field of Search ............... 252/390; 427/169, 292; 422/16; 106/14.16, 14.17, 14.31, 14.37, 14.42; 148/6.14 R

[56] References Cited

U.S. PATENT DOCUMENTS

| | | | |
|---|---|---|---|
| 2,698,258 | 12/1954 | McGraw et al. | 427/169 |
| 3,382,087 | 5/1968 | Ostrowski | 252/390 X |
| 3,597,353 | 8/1971 | Randell et al. | 252/390 X |
| 3,897,351 | 7/1975 | Davis et al. | 252/390 X |

OTHER PUBLICATIONS

Walker, R., "Corrosion Inhibition of Copper by Tolyltriazole", Abstract No. 196757z in *Chemical Abstracts*, vol. 85, issue 26, 1976.

*Primary Examiner*—Evan K. Lawrence
*Attorney, Agent, or Firm*—Buell, Blenko, Ziesenheim & Beck

[57] ABSTRACT

A method is provided for protecting silver and copper coated mirrors against oxidation and corrosion by passivating the metallic coating prior to applying a protective organic coating. The silver and copper can be passivated by applying an effective amount of tolyltriazole to the metal surfaces by spraying, wiping, flooding or the like.

2 Claims, 3 Drawing Figures

METHODS OF MANUFACTURING AND PROTECTING MIRRORS

BACKGROUND OF THE INVENTION

This invention relates to methods of manufacturing and protecting mirrors and particularly to methods of manufacturing and protecting mirrors against degradation of the silver and/or copper films by oxidation or chemical attack.

Glass mirrors are generally made by applying a layer of silver or copper or both to one side of a sheet of glass so as to provide a reflective surface. Generally this coating of metal is coated with an outer protective layer in the form of an organic paint system which covers the metal and the side of the glass as well. However, even with such a protective layer, the metal coatings may be subject to deterioration from oxidation or corrosion by the environment or by residual chemicals which remain on the mirror after completion of the "mirroring" step. This deterioration is very difficult if not impossible to stop over a long period of time by any of the practices known to date. In addition, many mirrors are cut from a larger mirrored sheet which cut portions expose the edges of the metal mirroring material which can then be attacked by atmospheric corrosion or oxidation or by cleaning chemicals, such as ammonia, used by the housewife.

SUMMARY OF THE INVENTION

I have discovered a method of protecting mirrors against all of these problems by a relatively inexpensive and easily applied treatment. I have found that by passivating the metal coating prior to applying an organic protective coating such as paint, I can eliminate these problems. The passivating can be accomplished by applying a solution of tolyltriazole to the metal surface, either during or after application of the metal. I can effectively eliminate the problems of mirror deterioration which has been common to the industry.

Preferably I apply a 0.25% or more solution of tolyltriazole to the metal surfaces of the mirror immediately after their application on the mirroring line, followed by rinsing and drying. However, the solution of tolyltriazole may be applied after the mirror is completed either by spraying on the solution or by wiping the solution on by hand or machine. In the case of small mirrors cut from a large mirror sheet, each cut edge must be wiped with the solution as well as the metal surface itself. The maximum upper limit of tolyltriazole which may be used is limited only by economics and by foaming problems which may arise when the concentration is too high in certain types of equipment. I have also found that the presence of tolytltriazole in the coolant solutions used in glass grinding and drilling solutions will not only protect the mirror being ground or drilled but will also inhibit corrosion of the grinding machinery itself. I have also found that tolyltriazole may be incorporated in the organic protective paint used to cover the metal with similar reduction in corrosion of the mirror.

I have also found that the incorporation of 0.25% or more of tolyltriazole in cleaning solutions for mirrors will eliminate the problem of deterioration of already installed mirrors, such as in bathrooms, etc. The edges of abutting mirrors used in bathrooms as tiling have been very subject to the deterioration which I mentioned above. This can be eliminated by incorporating tolyltriazole in the cleaning solution.

BRIEF DESCRIPTION OF THE DRAWING

In the foregoing general description I have set out certain objects, purposes and advantages of my invention. Other objects, purposes and advantages of this invention will be apparent from a consideration of the following description and the accompanying drawings, in which.

DESCRIPTION OF THE PREFERRED EMBODIMENTS

Figure 1:
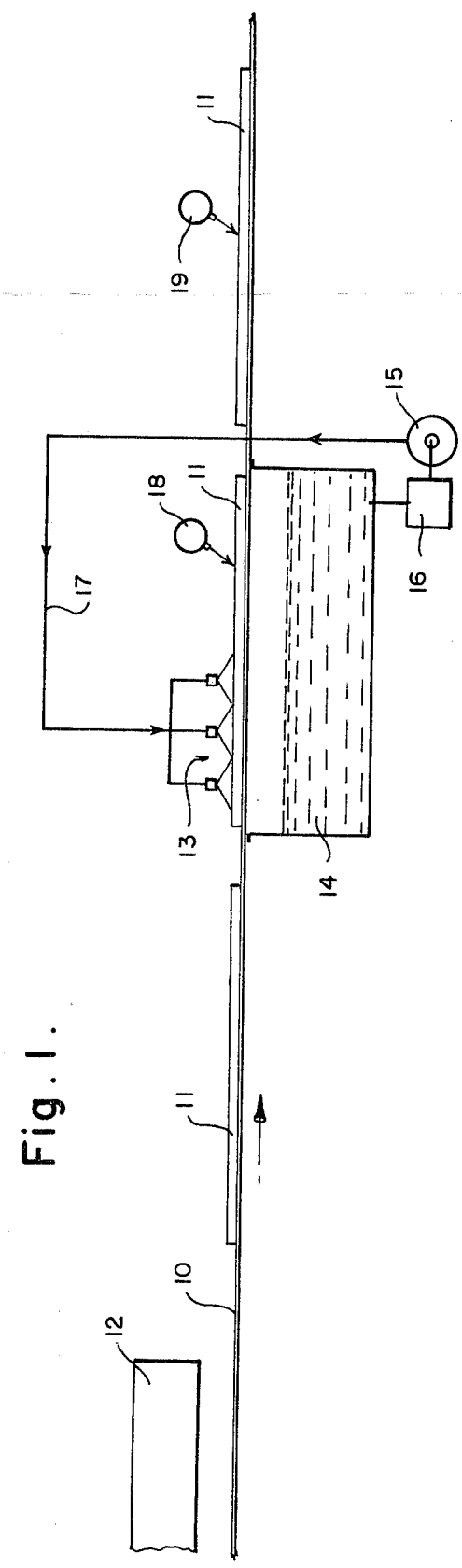
FIG. 1 is a generally schematic drawing of an apparatus for practicing the method of my invention in a mirroring line.

Referring to the drawings I have illustrated a conveyor 10 for carrying a mirror 11 from a copper and/or silver applying station 12 where a layer of metal is applied. The mirror 12 is passed beneath a traversing rinse spray 13 which receives a 0.3% solution of tolyltriazole from collector tank 14 by way of pump 15 and filter 16 and hose 17. The solution of tolyltriazole is sprayed from the traversing spray head 13 onto the metal surface of the mirror. The excess solution is removed by an air knife blowoff 18 and is collected in tank 14 for recirculation. The mirror 11 then passes to a fresh water rinse 19 and then to a dryer (not shown) of conventional design.

Figure 3:
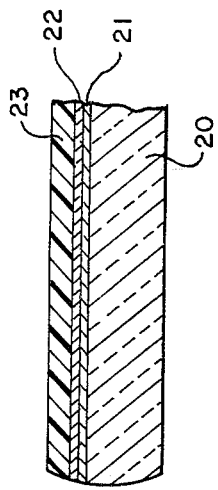
FIG. 3 is a fragmentary section of a conventional cut mirror edge.
Figure 2:
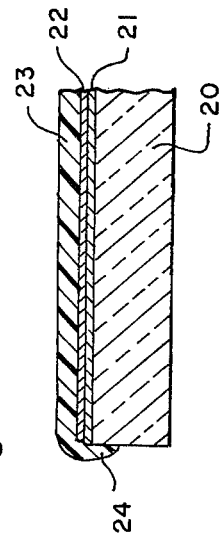
FIG. 2 is a fragmentary section of a completed conventional mirror edge.

In FIG. 2 I have illustrated a manufactured mirror as it would appear after completion, with the glass 20 coated first with a layer of silver 21, then with a layer of copper 22 and finally with a layer of an organic coating or paint 23. As can be seen from the drawings the organic coating goes over the side edge 24 to cover the metal coating edges. When such a mirror is later cut and the edges ground it will appear as in FIG. 3 without protection of the metal edges. Such unprotected edges are a prime source of mirror deterioration particularly during cleaning. I eliminate this problem by using the tolyltriazole solution as the grinding coolant or fluid following cutting of the mirror during the rounding off of the edge. Alternatively this can be accomplished by wiping the cut edge with the solution.

I have also found that I can eliminate the corrosion problem by including about 0.25% or more, prefereably less than 1% of tolyltriazole in the organic paint coating 23 used for the protective coating over the metal mirroring layers.

To illustrate the effectiveness of this treatment I have had comparative small mirror sections treated as shown in FIG. 1 with a solution of 0.3% tolyltriazole and with other oxidation and corrosion inhibitors. Each section has been handled daily by the same employee working on the mirror line to determine the corrosive effect of such handling on the mirror. In the case of the mirror treating according to this invention, after daily handling for four months, no deterioration of the mirror is evident, whereas with all other mirrors, deterioration was evident on the very first day of handling.

While I have illustrated and described certain presently preferred practices and embodiments of my invention in the foregoing specification, it will be evident that this invention may be otherwise practiced within the scope of the following claims.

I claim:

1. The method of treating mirrors having at least one metal layer selected from the group consisting of copper and silver and combinations thereof comprising the steps of,
   (a) applying to a freshly exposed surface of said metal layer a solution consisting essentially of at least about 0.25% tolyltriazole in a liquid solvent, and
   (b) drying said surface.

2. The method of treating mirrors having at least one metal layer from the group consisting of copper and silver and combinations thereof comprising the steps of,
   (a) applying to a freshly exposed metal coating an organic paint coating containing about 0.25% to 1% tolyltriazole, and
   (b) drying said surface to form a protective paint film thereover.

UNITED STATES PATENT AND TRADEMARK OFFICE
CERTIFICATE OF CORRECTION

PATENT NO. : 4,255,214
DATED : March 10, 1981
INVENTOR(S) : FRANK M. WORKENS

It is certified that error appears in the above—identified patent and that said Letters Patent are hereby corrected as shown below:

Claim 2, column 4, line 3, after "layer", insert --selected--.

Claim 2, column 4, line 5, after "exposed" insert --surface of said--, and change "coating" to --layer--.

Signed and Sealed this

Twenty-sixth Day of May 1981

[SEAL]

Attest:

RENE D. TEGTMEYER

Attesting Officer    Acting Commissioner of Patents and Trademarks